Feb. 13, 1951 J. B. MAGGIO 2,541,259

AUTOMATIC FREQUENCY CONTROL SYSTEM

Filed March 26, 1949

INVENTOR
J. B. MAGGIO
BY H. A. Burgess
ATTORNEY

Patented Feb. 13, 1951 2,541,259

UNITED STATES PATENT OFFICE 2,541,259

AUTOMATIC FREQUENCY CONTROL SYSTEM

John B. Maggio, Summit, N. J., assignor to Bell Telephone Laboratories, Incorporated, New York, N. Y., a corporation of New York Application March 26, 1949, Serial No. 83,706

10 Claims. (Cl. 250—40)

This invention relates to frequency control circuits and more particularly to circuits for controlling the frequency of a beating oscillator in response to the frequency of a radio frequency signal wave.

It is an object of this invention to maintain a constant difference frequency in radio communication means wherein signal waves are beaten with waves from a local oscillator to obtain the difference frequency therefrom.

It is a further object of the invention to maintain such a constant difference frequency without the employment of direct-current amplifiers.

Another object is to control the frequency of a local oscillator in such a system by means of both a control voltage which is indicative of the magnitude and sense of the deviation in frequency of received signal waves from a predetermined value, and an initial voltage which may be varied independently of said control voltage.

A further object is to limit the magnitude of the said control voltage so that a local oscillator operating at ultra-high frequencies will not be driven out of the mode of oscillation as determined by said initial voltage.

It is also an object of the invention to maintain the frequency of the local oscillator at a value determined by said initial voltage in the event of a failure of the means producing said control voltage.

It is also an object to maintain a constant difference frequency in a radio system of the type described wherein said signal waves comprise either television or speech modulated waves.

In accordance with a specific embodiment of the invention described in detail hereinafter for the purpose of illustration, control pulses are derived from incoming signal waves, which pulses are indicative of the frequency error of the said waves. The control pulses are amplified by an amount dependent on the desired slope of the control characteristic at crossover. The amplified control pulses, in combination with clamping pulses of constant amplitude and polarity, control the charge on a condenser relative to a charge determined by a manually controlled initial voltage.

Other features and aspects of the invention may be understood with reference to the following detailed description of an illustrative embodiment taken in accordance with the accompanying drawing in which.

Figure 1:
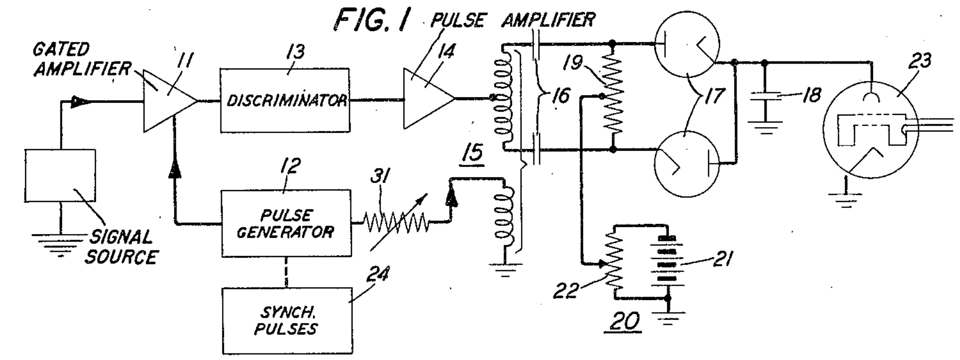
Fig. 1 is an automatic frequency control system, in schematic, embodying principles of the invention.

Referring now to Fig. 1, the incoming signal is converted to a series of pulses by passing it through the gated amplifier 11 which may be any one of the types well known in the art. Gating pulses are supplied to the amplifier 11 from the pulse generator 12. Gated amplifiers and pulse generators are well known in the art and will not be described herein.

The output of the gated amplifier drives a conventional discriminator 13 which has a sufficiently fast time constant so that the discriminator output is a pulse of approximately the same duration as that of the pulse used to gate amplifier 11. The amplitude of the discriminator output pulse will be a function of the magnitude of the deviation in frequency of the incoming signal from the crossover frequency of the discriminator; the polarity of the pulse will be determined by the sense of the deviation. The discriminator may be any of the types well known in the art, its only requirements being that it have an output indicative of the frequency error of the applied signal and that it have a time constant as just described.

The frequency error pulses are then amplified by a pulse amplifier 14, the only requirement on the amplifier being that it shall roughly maintain the width of the pulses and that it shall not introduce excessive delay.

The output of the pulse amplifier 14 provides longitudinal drive on the secondary of a pulse transformer 15 while a balanced voltage is coupled into the same winding from the pulse generator 12. The sums of these two pulses are applied through the charging condensers 16 and a pair of diodes 17 which in turn charge and discharge the condenser 18.

This latter circuit is a form of inverted clamp circuit and acts to charge the condenser 18 to a voltage which equals the output of the pulse amplifier 14. In the absence of a control pulse, the balanced voltage from the pulse generator, or, clamping pulse, merely charges the condensers 16 each to a voltage equal to approximately one-half the voltage of the clamp pulse and produces no effect on the condenser 18 due to the series connection of the diodes 17. For the present illustration, the clamp pulses are assumed to be positive. Also the condensers 16 are assumed to be of substantially larger capacities than the condenser 18, for example, on the order of ten to one.

If, in addition to the clamp pulse, the output of the pulse amplifier 14 is a positive control pulse of an amplitude less than one-half the amplitude of the clamp pulse, the charge on the upper condenser 16 will be increased and the condenser 18 will be instantaneously charged through the upper diode 17 to a voltage substantially equal to the output of the pulse amplifier. The condenser 18 will not discharge through the lower diode 17 due to the charge on the lower condenser 16 which holds it non-conducting. The condenser 18, therefore, will hold its charge until a new pulse arrives, at which time it will instantaneously change to suit the new conditions. A control pulse more positive than the preceding one will cause the condenser 18 to be further charged through the upper diode 17. A less positive pulse will immediately decrease the charge by a conduction path through the lower diode 17.

It will be noted that the charging condensers 16 hold their respective diodes non-conducting only for values of voltage on the condenser 18 which are within the range of approximately plus or minus one-half of the clamp voltage. If, therefore, the output of the pulse amplifier 14 is a control pulse whose amplitude is greater, either positively or negatively, than one-half of the absolute magnitude of the clamp voltage, it will charge the condenser 18 only to this latter value. The magnitude of the clamp pulses, which may be controlled by the variable resistor 31, therefore serves as a means for limiting the magnitude of the corrective voltage which the automatic frequency control circuit will apply to the circuit which it controls.

Any arbitrary initial voltage of either polarity may be added to the output of the circuit by the resistance network 19 from the direct-current source 20 comprising a battery 21 and a potentiometer 22; such a voltage will provide an initial charge on the condenser 18. The charge on the condenser 18 is thus varied by the control pulses of the pulse amplifier 14 about a value determined by the setting of the potentiometer 22 and limited by the amplitude of the clamp pulses from the pulse generator 12.

In the specific embodiment shown in Fig. 1 the voltage on the condenser 18 serves as the repeller voltage of a reflex Klystron 23. In the absence of control pulses from the discriminator 13, the repeller voltage, and hence the output frequency of the Klystron, will be determined by the setting of the potentiometer 22. If the frequency of the incoming signal wave should deviate from the value determined by the discriminator 13, the repeller voltage will be greater or less than that value determined by the setting of the potentiometer 22, by an amount dependent on the magnitude and the sense of the frequency error of the incoming signal. The Klystron output frequency will therefore be immediately adjusted to suit the new conditions. If, for example, the incoming signal waves are beaten with the output of the oscillator 23 to obtain the difference, or, intermediate, frequency therefrom, the control action of the circuit as just described will tend to hold this difference frequency at a constant value.

For application to radar systems, the modulator pulse of the radar transmitter could serve both as a source of gate pulses for the amplifier 11 and as a source of clamp pulses for the inverted clamp circuit. For microwave systems transmitting television by frequency modulation, it would be necessary to trigger the pulse generator 12 in synchronism with the synchronizing pulses of the television signal so that the frequency will be measured at definite and known points in the modulation cycle. Such synchronizing pulses could be supplied in any well-known manner from the network 24. For systems transmitting speech, the pulse generator 12 could be free-running, for example, a free-running blocking oscillator, at any desired frequency.

It will be noted that although the circuit has direct-current gain, direct-current amplifiers have been eliminated. All of the amplification is obtained in a frequency range where stable gain is readily to be had and cumbersome balanced amplifiers are unnecessary.

Another feature of the invention is that the initial output voltage supplied by the potentiometer 22 and the control voltage output of the pulse amplifier 14 are completely independent and are mixed only at the output of the control system. It is thus possible to accommodate variations of the beating oscillator 23 over wide limits by varying the potentiometer 22 and without affecting the control action of the circuit.

Another feature lies in the fact that tube or circuit component failures at any point in the circuit except the final clamping diodes 17 will result in reversion of the output voltage on the condenser 18 to that previously established under manual control by the potentiometer 22.

With certain of the ultra-high frequency oscillators, for example, reflex Klystrons, it is important that the automatic frequency control shall not drive the oscillator out of its mode of oscillation. It is also desirable to have a control circuit which is highly sensitive to frequency variations within the desired range.

Figure 2:
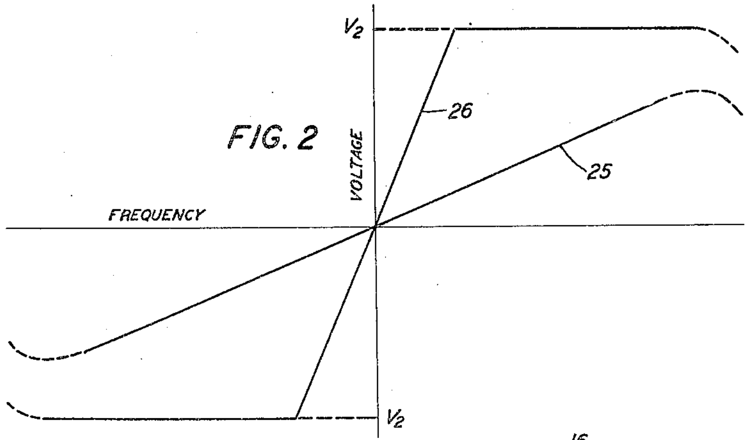
Fig. 2 is a graph illustrative of a feature of the present invention.

As previously described, it is possible to limit the range of the control action by properly adjusting the magnitude of the clamp pulses fed to the inverted clamp circuit. This limiting action may be supplemented or replaced by properly designing the pulse amplifier 12 so that the limiting of its output takes place at any desired value, for example, $V_2$ as shown in Fig. 2.

By controlling the gain of the pulse amplifier the slope of the frequency characteristic at crossover may be varied to conform to requirements. For example, if the voltage gain of the pulse amplifier 14 is 1, the control characteristic at crossover may appear as shown by the curve 25 in Fig. 2. If the gain of the amplifier is increased to 5, the control characteristic slope will be correspondingly increased and appear as the curve 26.

A circuit has therefore been designed whereby the discriminator slope at crossover may easily be varied without affecting the magnitude of the maximum control voltage. The control circuit may therefore be highly sensitive to frequency variations in the desired range but will not drive the beating oscillator out of an oscillating mode. The pulse amplifier 14 may, of course, comprise more than one stage of amplification so that the desired control characteristic may be obtained.

In an ultra-high frequency broad-band carrier system, the transmitted signals may contain components of such frequencies as will beat with the gating pulses applied to the amplifier 11 and cause the discriminator 13 to have an output dependent on the beat frequency components resulting therefrom rather than the carrier frequency of the incoming signals. Such a condition is prevented if the system is transmitting television by gating the amplifier 11 in synchronism with the synchronizing pulses of the television signal as previously described.

Figure 3:
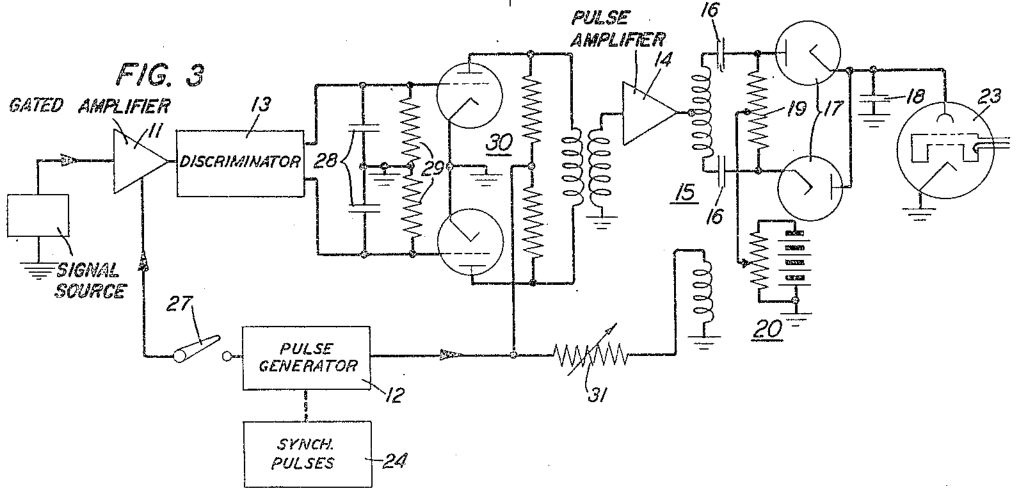
Fig. 3 illustrates a modification of the system of Fig. 1.

With reference now to Fig. 3, if the system is transmitting speech signals and there is a likelihood of adverse beating of the carrier components and the gating pulses of the amplifier 11, the gating pulses should be removed from the amplifier 11 as by opening the switch 27. The integration network comprising the condensers 28 and the resistors 29 is therefore necessary so that the circuit will control in response to the average rather than the instantaneous frequency of the incoming signals. The discriminator output, after integration, is converted into pulses by the pulse modulator 30 for amplification by the pulse amplifier 14, the remainder of the circuit being as previously described.

The circuit may easily be conditioned for television signals by closing the switch 27 so that the amplifier 11 will be properly gated as previously described. The integration and pulse modulator components represent an unnecessary step in the control action for television signals and could be removed but will not adversely affect such action if allowed to remain. Such removal could be effected by grounding one output lead of the discriminator 13 and switching the other to the input of the pulse amplifier 14.

Although the invention has been described as relating to specific embodiments, numerous other arrangements may be devised by those skilled in the art without departing from the spirit and scope of the invention.

What is claimed is:

1. In a signal receiver, an oscillator adapted to have its frequency controlled by received signal waves, said oscillator having a voltage controlled frequency determining means, means for receiving said signal waves, a source of direct voltage, means to vary said source, means to amplify said signal waves, means to derive a pulse output from said amplifying means comprising a pulse generator connected to said amplifier to cause said amplifier to be rendered alternately conductive and non-conductive, discriminator means connected to the output of said amplifier for deriving control pulses therefrom, means to amplify said control pulses, capacitive means, means connecting said source to said capacitive means to charge the same, means to impress said amplified control pulses on said capacitive means to vary said charge, and means connecting said voltage-controlled frequency determining means to said capacitive means to receive control voltages therefrom.

2. Frequency control apparatus in a signal receiver having an oscillator adapted to have its frequency controlled by received signal waves, said oscillator having a voltage controlled frequency determining means, said control apparatus comprising means for receiving said signal waves, discriminator means connected to said receiving means for deriving control pulses from said received signal waves, said pulses having amplitudes and polarities indicative of the magnitude and sense respectively of the deviation in frequency of said signal waves from a predetermined value, means to amplify said control pulses, a source of direct voltage, means to vary said source, capacitive means charged by said source, means to impress said control pulses on said capacitive means to vary the charge thereon by an amount proportional to and in a sense determined by said control pulses, and means connecting said voltage-controlled frequency determining means to said capacitive means to receive control voltages therefrom.

3. The combination in accordance with claim 2, said means to vary the charge on said capacitive means comprising a pair of diodes connected as alternative paths between said pulse amplifier and said capacitive means, means comprising one of said paths to apply said control pulses to said capacitive means, charging condensers interposed between each of said diodes and said pulse amplifier, a source of recurrent pulses in synchronism with said control pulses, means connecting said source to charge said charging condensers, and said condensers adapted to hold said charge for the interval between successive control pulses whereby said diodes are maintained non-conducting for a like period.

4. In a radio system, means for receiving radio frequency signal waves, means to convert said waves into pulses of a predetermined duration and at a predetermined rate, a discriminator, means to impress said pulses on said discriminator to produce output pulses therefrom which are of approximately the same duration and rate as said first-named pulses and which are of an amplitude and polarity indicative of the frequency error of said signal waves referred to a frequency value predetermined by said discriminator, means to amplify the pulses produced by said discriminator, condenser means, a source of direct voltage, means connecting said source to said condenser means to impress an initial charge thereon, means to impress said amplified pulses on said condenser to vary said charge as a function of the magnitude and polarity of said amplified pulses, an oscillator adapted to have its frequency controlled by said received waves, and means to impress the voltage on said condenser on said oscillator to control the frequency thereof.

5. Frequency control means in a radio system for controlling the frequency of a local oscillator in response to the deviation in frequency of received signal waves, means to receive and amplify said signal waves, pulse generator means, means comprising said last-named means to render said amplifier means alternately conducting and non-conducting whereby a pulse output is derived from said amplifier, frequency discriminator means, means to apply said pulses to said discriminator, said discriminator having a time constant sufficiently short so that the output of said discriminator will be control pulses of approximately the same duration as said first-named pulses, means to amplify said control pulses, a condenser, a variable source of direct voltage connected to charge said condenser, means to impress said control pulses on said condenser means to control the charge thereon relative to the charge determined by said source of direct voltage, and means connecting said oscillator to said condenser to receive control voltage therefrom.

6. The method of controlling the frequency of an oscillator having voltage controlled frequency determining means in accordance with the deviation in frequency of received signal waves from a predetermined value, said method comprising converting said signal waves into pulses of uniform duration and at a predetermined rate, converting said pulses into control pulses of a magnitude and polarity indicative of said deviation in frequency of said signal waves, amplifying said control pulses, storing an electric charge substantially simultaneously with the occurrence of each control pulse and directly in proportion to the amplitude and polarity thereof, and operating said voltage controlled means in response to said charges.

7. The combination with a radio frequency oscillator having a voltage controlled frequency determining means, of means to receive radio signal waves and frequency control means to control said voltage in accordance with the frequency of said signal waves, said frequency control means comprising an amplifier, means to impress said waves on said amplifier, a source of recurrent pulses, means connecting said pulse source to said amplifier to convert said signal waves into control pulses of approximately equal duration and at a substantially uniform rate, a frequency discriminator, means to impress said control pulses on said discriminator, said discriminator having a time constant such that its output will comprise control pulses of approximately the same duration and occurring at substantially the same rate as said control pulses, means to amplify said pulses, a storage capacitor, diode means connected to provide alternative paths between said pulse amplifier and said storage capacitor, means comprising one of said paths to impress said amplified pulses on said storage capacitor, means to prevent said capacitor from discharging through said diode means between successive control pulses comprising a charging capacitor in series with each of said diode means and means to impress pulses from said pulse source on each of said charging capacitors, and means connecting said voltage-controlled frequency determining means to said storage capacitor to receive control voltages therefrom.

8. In a radio system including means for receiving radio frequency signal waves, the combination for controlling the frequency of a local oscillator, having frequency determining means, in response to the deviation in frequency of said waves, said combination comprising a source of recurrent pulses, a frequency discriminator, means to impress said waves on said discriminator, means comprising said discriminator and gated by said source for deriving from said signal waves control pulses indicative of the magnitude and polarity of the frequency error of said signal waves, means to amplify said control pulses, storage capacitor means, means to impress said amplified control pulses on said capacitor means to charge it to a value determined by the magnitude and polarity of said amplified control pulses, and means to maintain said charge during the interval between successive pulses which comprise means connected in series with and interposed between said control pulse amplifier and said storage capacitor and connected to receive pulses from said source of recurrent pulses, and means connecting said frequency determining means to said storage capacitor to derive control voltages therefrom.

9. The combination according to claim 8 and direct-current source means connected to impress an initial charge on said storage capacitor.

10. The combination according to claim 8 wherein said means to maintain the charge on said storage capacitor between successive pulses comprises a pair of diodes connected together and poled in series, means connecting the output of said pulse amplifier to a point in the connection between said diodes, means connecting one side of said storage capacitor to the electrodes of said diodes other than those connected to said point, a first and a second charging capacitor connected between said point and each of said diodes respectively, means to impress pulses from said source on said first and second capacitors in a push-pull manner, and said first and second charging capacitors adapted to hold the charges impressed thereon for at least the interval between successive control pulses.

JOHN B. MAGGIO.

REFERENCES CITED

The following references are of record in the file of this patent:

UNITED STATES PATENTS

| Number | Name | Date |
|---|---|---|
| 2,425,352 | Sloss | Aug. 15, 1947 |
| 2,474,354 | Guanella | June 28, 1949 |